Figure 1:
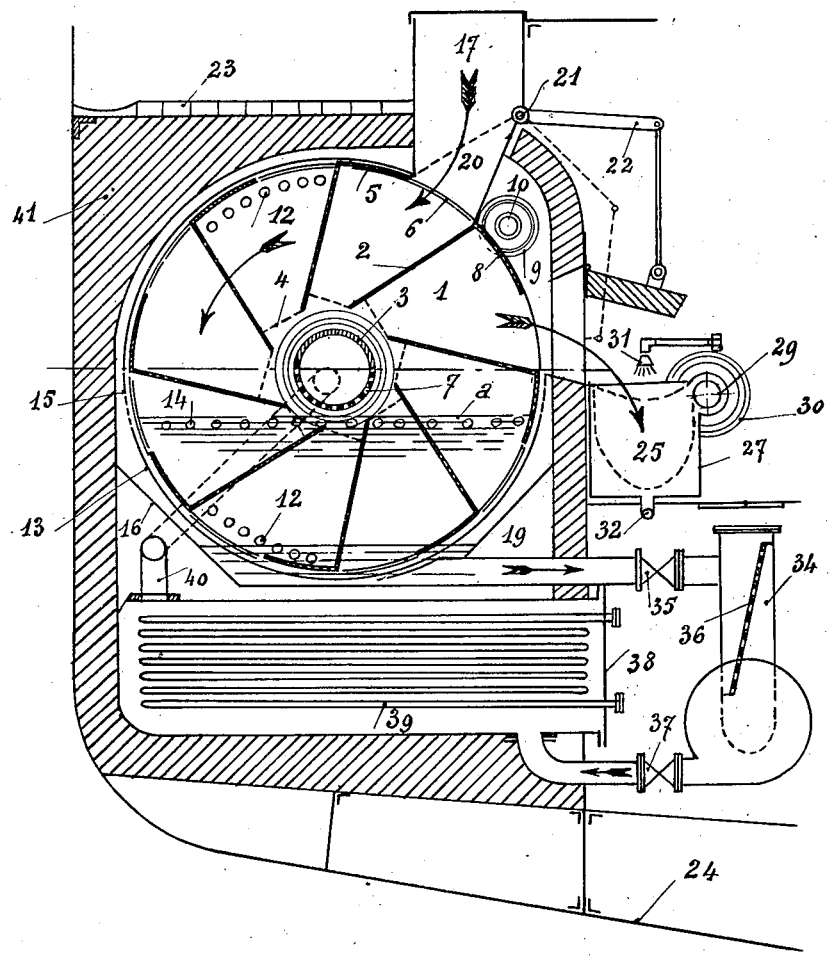

Jan. 2, 1934.  J. E. W. REEH  1,942,307
REFRIGERATOR
Filed Nov. 11 1929   2 Sheets-Sheet 1

INVENTOR.
Joannes E. W. Reeh.
By William C. Luton
Attorney.

Jan. 2, 1934.　　　　J. E. W. REEH　　　　1,942,307
REFRIGERATOR
Filed Nov. 11 1929　　2 Sheets-Sheet 2

INVENTOR.
Joannes F. W. Reeh

By William C. Linton
Attorney.

Patented Jan. 2, 1934

UNITED STATES PATENT OFFICE 1,942,307

REFRIGERATOR

Joannes Emmerick Wolf Reeh, Chatenay, France, assignor to Société Anonyme de Conservation Industrielle du Poisson, Paris, France Application November 11, 1929, Serial No. 406,389, and in France September 14, 1929

10 Claims. (Cl. 62—104)

The present invention relates to refrigerators and more particularly to apparatus adapted for freezing fish on board fishing vessels.

By the present invention fish without having previously been washed or handled in any other way than that necessary for sorting, is immediately after capture introduced into an apparatus so constructed that the fish firstly undergoes pre-refrigeration by the dry process, then a rapid congelation by the wet process, followed by draining and finally by washing in sea water previously cooled to −5° C. As a result the fish has appearance and taste of fish fresh from the water, even after several months of preservation in a refrigerator.

The apparatus of the invention allows the various phases indicated to be effected automatically in the given order without manual labour, and with a great economy of cold, and of driving force. Moreover, it is of comparatively small size, and has no complicated movements which are likely to be influenced by the rolling or pitching of the boat, and which would thus hinder its efficient operation.

According to the invention, the apparatus includes a drum divided into longitudinal compartments, the walls of each extending substantially in a radial direction from the axis of rotation of the drum. The fish to be frozen is received into these compartments which rotate about a hollow shaft secured and perforated on its lower half in order to distribute the refrigerant on the fish contained in the compartments of the drum when they pass below the horizontal plane of the axis of the shaft.

The drum is mounted in a cylindrically-shaped bucket, and is enclosed in a reservoir, with dividing walls, capable of containing the evaporator of the freezing machine. A pump effects the circulation of the refrigerating liquid, which, after filtration, is forced into the evaporator of the freezing machine, and from there into the hollow shaft of the drum, which distributes it uniformly into the compartments disposed below the horizontal plane of the axis of the drum. The initial level of the refrigerating liquid below the hollow shaft is maintained in the lower compartments of the drum, by means of apertures made at the periphery of the two ends of the drum, which establish communication with the bucket, the walls of which are provided with permanent or adjustable apertures, which allow the level of the liquid to be established below the hollow shaft.

The second level, lower than the first, is established in the bottom of a separate reservoir, which passes the drum and its bucket. This level is maintained practically constant by the fact that all the filtering, circulatory and freezing mechanism, completely enclosed, are disposed below the second level and by the quantity of liquid drained off being equal to that received in the bucket.

The fish introduced into and contained in the upper compartments of the drum undergoes an efficacious pre-refrigeration through being kept in a highly frozen medium. The various phases of the operation are effected by the simple rotation of the drum on the hollow shaft. This setting into rotation requires only little power, this wheel acting as a wheel of a water motor, moved by the load of fish.

The apparatus is arranged in such a way that the fish is introduced into the first compartment from the top by means of a hopper with movable bottom. By slowly rotating the drum the compartment, having received its load, passes firstly into the pre-refrigerating zone, and then into the circuit of the refrigerating liquid, after which the fish is effectively drained. The walls of the compartments are inclined in such a way that the fish can leave the drum by merely sliding on the inclined plane, whence it can fall directly into the washing bowl mounted outside the actual refrigerator itself.

Figure 2:
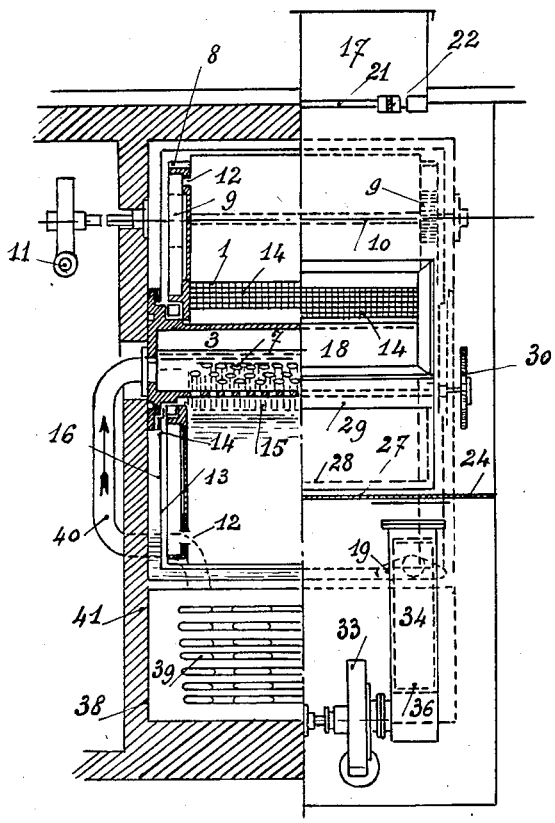

Other advantages and particularities of the invention are described in the following specification, with reference to the diagrammatical drawings appended by way of example, in which Figure 1 is a transverse section of the apparatus. Figure 2 at the left hand side thereof is a sectional view and on the right hand side is an end elevation of the apparatus.

The apparatus essentially comprises a drum 1 divided into compartments extending longitudinally of the drum by partitions 2 radially inclined to the axis of the drum. The drum is mounted so that it may rotate freely on a fixed hollow shaft 3. The central part of each compartment of the drum is formed by a grating 4, and on a part of the opposite side or periphery by a flange 5, leaving a part 6 of the periphery free for loading and unloading. The hollow shaft 3 is provided with openings 7 in the part below the horizontal plane of the axis of the shaft 3.

The rotation of the drum is controlled by a system of gears consisting of one or two toothed wheels such as 8, mounted on the end or ends of the drum 1 and meshing with a pinion 9, mounted on a shaft 10. This shaft can be set in motion by any suitable mechanism e. g. a screw-drive and worm wheel, as shown at 11. A series of holes 12 is provided at the ends of the drums in order to allow the refrigerating liquid to flow easily, without however, allowing the fish to touch them.

Where desirable, the peripheral openings 6 of the compartments can be enclosed by suitable covers (not shown in the drawings).

A cylindrical casing or bucket 13, concentrically surrounds the drum. This bucket is provided with a series of apertures 14, in the end or ends 15 and at the periphery; these apertures are arranged in such a way that a level $a$ of liquid can be established in the bucket without coming into contact with the hollow shaft 3. The device described above is mounted in the interior of a reservoir 16, having a charging hopper at the top and a suction pipe for the refrigerating liquid at the bottom.

The loading hopper 17, has a movable base or closure which pivots with a shaft 21, after the manner of a valve, whilst a lever 22 is connected to said shaft and is also connected with and simultaneously controls the opening of a cover or door for a discharge opening 18. The shaft 21 may be driven from the main driving mechanism.

The fish are introduced in the hopper 17 over the deck 23 of a boat 24, and fall into the drum, in the direction indicated by an arrow. The drum, rotating in an anti-clockwise direction, allows the frozen fish finally to slide into a washing bowl 25, mounted outside the reservoir 16, and below the opening 18.

The washing apparatus comprises a housing 27, having a net 28, wound round the drum 29, mechanically driven at 30.

The fish falling onto the net, which has been unrolled, is watered by a suitable device 31, and the washing water runs off through the pipe 32. At the end of the washing operation the fish are taken up again by setting the drum 29 in motion. This motion can be controlled automatically and simultaneously by mechanism moved by the drum (by means of a drive not shown on the drawings).

The refrigerating liquid is drawn through a filter 34 by the centrifugal pump 33. The filter is connected to the pipe 19 of the reservoir through a stop-valve 35. In the interior of the filter is mounted a strainer 36, which is easily accessible.

The centrifugal pump, provided with a valve 37, forces the liquid into the vat 38, for the evaporator 39 of the freezing machine, whence it is forced into the hollow shaft 3 by way of the pipe 40.

All the members of the arrangement described are protected by a suitable isolating wall 41, interposed between the walls of the boat, the reservoir 16, and the evaporating vat 38.

It will be seen that the drum is located below the deck, at the side, and the discharge opening from the drum is so disposed that the fish, in frozen condition, exit to a longitudinal passageway by which they may be taken fore or aft to conveniently located storage compartments.

The person operating the apparatus stands on the false deck shown at the top of the hopper 17. It must be understood that the apparatus has only been described with reference to the appended drawings by way of example, and that it can be modified in various details without departing from the invention.

Having now particularly described my said invention and in what manner the same is to be performed, I declare that what I claim is:

1. A refrigerator more particularly for fish, in which a drum is divided into longitudinal compartments and is mounted for rotation on a fixed hollow shaft which is perforated at its lower part, in order to distribute refrigerating liquid, a cylindrical bucket surrounding and coaxial with the drum and apertured below the hollow shaft at such a height that the liquid contained in the bucket and in the interior of the drum cannot reach the hollow shaft.

2. Apparatus as claimed in claim 1, in which the longitudinal compartments of the drum are formed by partitions therein inclined to radial planes passing through the axis of the drum in order to permit discharging by the sliding of the frozen fish and a slowing-down of the fish at the point of admission.

3. Apparatus as claimed in claim 1, in which the longitudinal compartments formed between the partitions are provided with a grating at the inner periphery and closed at the outer periphery by the wall of the bucket which surrounds the drum, the said bucket being provided with openings for loading and unloading.

4. Apparatus as claimed in claim 1, in which a loading hopper for the drum is provided with a pivoted base or closure which is connected to the drive for the drum in order to be operated by it.

5. Apparatus as claimed in claim 1, in which a washing bowl, provided at the exit of the bucket is provided with a net, which is adapted to the shape of the bowl, and one end of which is secured to the bowl while the other end of the net is connected with the drum for rolling it up and for effecting the raising and draining of the fish.

6. A refrigerator comprising a rotatable structure having a plurality of compartments, means for circulating a refrigerating liquid through said rotatable structure, a housing for said rotatable structure, two openings in said housing for access to two of said compartments respectively, a closure for each of said openings, and means connecting said closures whereby both open simultaneously and close simultaneously.

7. A vessel having a rotatable drum mounted below an open deck, said drum being divided into a plurality of compartments, means for introducing fish from said deck into said compartments, means for circulating a liquid refrigerant through said compartments, and means for removing fish from said compartments below deck.

8. A vessel having a rotatable drum mounted below an open deck at the side of the vessel, said drum being divided into a plurality of compartments, means for introducing fish from said deck into said compartments, means for circulating a liquid refrigerant through said compartments, and means for removing fish from said compartments toward the center of the vessel below deck.

9. A vessel having a rotatable structure comprising a plurality of compartments mounted below an open deck, means for introducing fish from said deck into said compartments, a reservoir for a liquid refrigerant situated below said structure, cooling coils in said reservoir, means for circulating said liquid refrigerant from said reservoir through said rotatable structure and back to said reservoir, and means for removing fish from said compartments toward the center of the vessel below deck.

10. A vessel having a rotatable structure comprising a plurality of compartments mounted below an open deck, means for introducing fish from said deck into said compartments, a reservoir for a liquid refrigerant situated below said structure, cooling coils in said reservoir, means for circulating said liquid refrigerant from said reservoir through said rotatable structure and back to said reservoir, means for removing fish from said compartments toward the center of the vessel below deck, and means at said fish removing means for washing the fish.

JOANNES EMMERICK WOLF REEH.